United States Patent

Okada

[11] Patent Number: 5,133,188
[45] Date of Patent: Jul. 28, 1992

[54] SUPERCHARGED ENGINE

[75] Inventor: Masaki Okada, Fujisawa, Japan

[73] Assignee: Isuzu Motors Limited, Tokyo, Japan

[21] Appl. No.: 579,755

[22] Filed: Sep. 10, 1990

[30] Foreign Application Priority Data

Sep. 11, 1989 [JP] Japan .................. 1-232753

[51] Int. Cl.$^5$ .............................. F02B 33/44
[52] U.S. Cl. ...................... 60/609; 123/561; 123/562
[58] Field of Search ............... 60/609, 612, 624; 417/364; 123/561, 562, 559.3

[56] References Cited

U.S. PATENT DOCUMENTS

| | | | |
|---|---|---|---|
| 2,658,400 | 10/1953 | Dodge | 417/364 |
| 2,755,618 | 7/1956 | Peterson | 123/562 |
| 4,505,117 | 3/1985 | Matsuoka | 60/609 |
| 4,897,998 | 2/1990 | Sekiyama et al. | 60/624 |

Primary Examiner—Richard A. Bertsch
Assistant Examiner—Charles G. Freay
Attorney, Agent, or Firm—Dykema Gossett

[57] ABSTRACT

An engine having a turbocharger is supercharged by an air compressor and decelerated by another air compressor. These two air compressors are connected with the crankshaft of the engine. The former air compressor possesses a capacity smaller than the latter. Clutches are provided between the air compressors and crankshaft. When the engine is operated at a low speed and the supercharging to the turbocharger is insufficient, the supercharging air compressor is activated whereas when the engine is operated at an intermediate or high speed an a large brake force is required, the brake air compressor is activated to ensure a safe deceleration of the vehicle.

7 Claims, 3 Drawing Sheets

SUPERCHARGED ENGINE

BACKGROUND OF THE INVENTION

1. Technical Field

The present invention generally relates to a superchaged engine and more particularly relates to an engine associated with a turbocharger, a large capacity air compressor for a brake and a small capacity air compressor for supercharging.

2. Background Art

In automobile engineering, one primary object is to attain an engine which is lightweight, compact but with high output and less fuel consumption. Also, an increasing degree of freedom in various aspects in an engine-designing is an important goal. For these reasons, the engine has been supercharged. In other words, research on high net mean effective pressure has been conducted. However, following problems are not solved yet:

(i) The engine torque becomes lower at low speed conditions as compared with an engine output having a same output; and
(ii) Engine brake force and exhaust brake force do not change with output of the engine so that these brake forces decrease relatively.

The present assignee filed several Japanese patent applications, for example "Turbine-type brake" Japanese Patent Application No. 63-302151. These applications disclose an arrangement represented by an illustration of FIG. 3 of the accompanying drawings. Specifically, a centrifugal compressor (b) is connected with a crankshaft (a) via a gear train (d) and the compressor (b) is operated during a braking operation to apply a brake force to the crankshaft (a) or an engine (c). This arrangement can overcome the above-mentioned problem (ii) but cannot overcome problem (i).

SUMMARY OF THE INVENTION

An object of the present invention is to provide a turbocharged engine which can exhibit an adequate torque even under a low speed condition and an adequate brake force relative to the output of the engine.

According to one aspect of the present invention, there is provided an engine associated with a turbocharger characterized in that the engine is supercharged by a first air compressor having a relatively small capacity for supercharging, that a second air compressor having a relatively large capacity is provided for braking, that a first output shaft is selectively connected with a crankshaft of the engine and with the small capacity air compressor (supercharging air compressor), that a second output shaft is also selectively connected with the crankshaft of the engine and with the large capacity air compressor (braking air compressor) and that these are provided clutch means between these air compressors and respective output shafts. The supercharging air compressor ensures an adequate supercharging so that the engine torque is maintained at a proper level even under low speed conditions. The braking air compressor consumes energy of the engine to apply a brake force to the engine. The braking air compressor ensures an adequate brake force at high speed conditions.

DESCRIPTION OF THE PREFERRED EMBODIMENTS

An embodiment of the present invention will be described with reference to the accompanying drawings.

Figure 1:
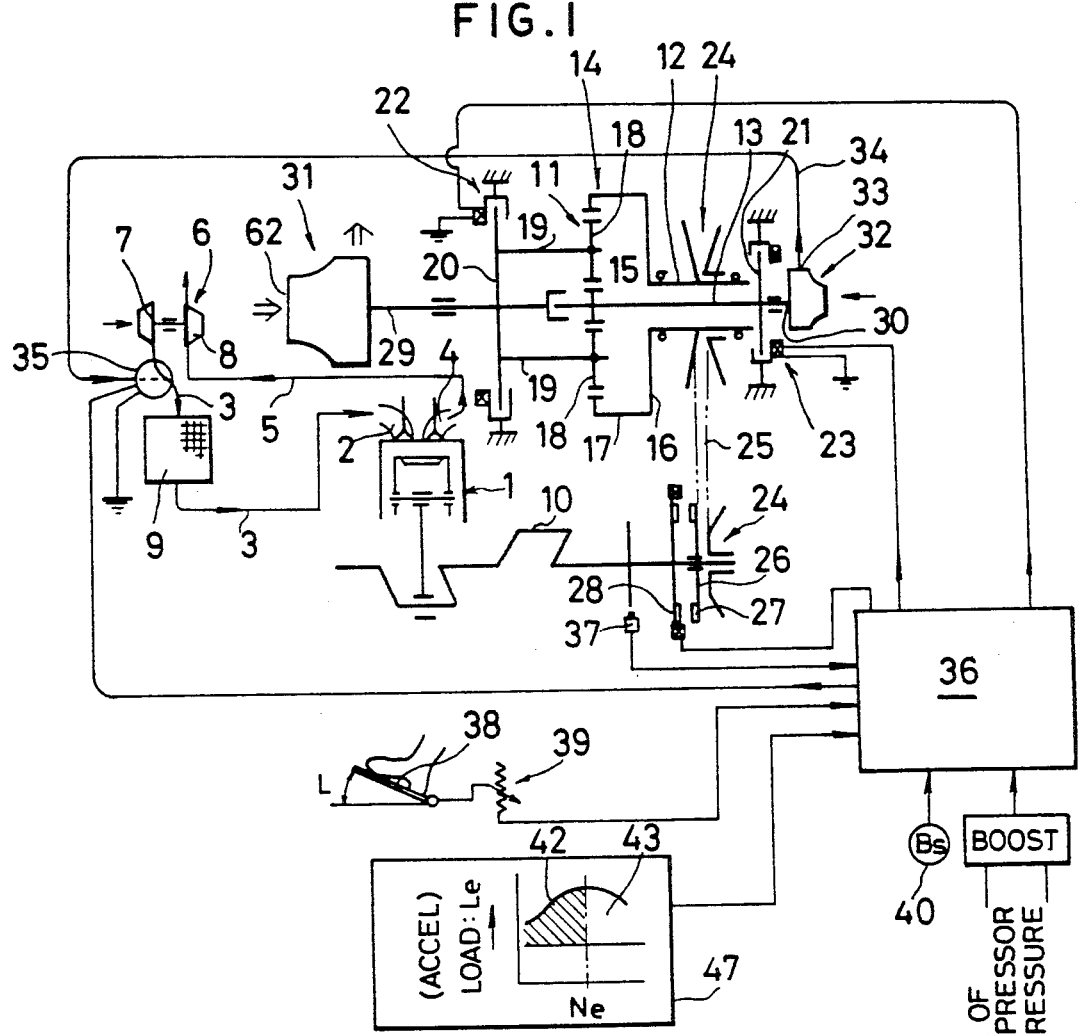
FIG. 1 is a block diagram of a supercharged engine according to the present invention.

Referring to FIG. 1, an intake passage 3 is connect with an intake port 2 of an engine 1. An exhaust passage 5 is connected with an exhaust port 4 of the engine 1. A turbocharger 6 has a blower 7 disposed at an upstream position of the intake passage 3. The turbocharger 6 also has a turbine 8 disposed at a downstream position of the exhaust passage 5. A charge cooler 9 is provided in the intake passage 3 at a position downstream of the blower 8. The charge cooler 9 cools supercharged air and raises charging efficiency. A crankshaft 10 of the engine 1 is connected with a transmission 11. The transmission 11 operates two air compressors in different manners. The transmission 11 includes a hollow shaft (outer shaft) 12 and an inner shaft 13 extending through the outer shaft 12. The inner shaft 13 and the outer shaft 12 are connected with each other by a planetary gear mechanism 14. Specifically, a sun gear 15 is mounted near one end of the inner shaft 13 and an inner gear 17 is provided on a flange 16 extending from the outer shaft 12. A plurality of planetary gears 18 are positioned between the sun gear 15 and inner gear 17. A disk-shaped first clutch plate 20 is mounted on a carrier 19 of the planetary gears 18. The first clutch plate 20 has a mutual center with the inner shaft 13. A second clutch plate 21 is mounted on the other end of the inner shaft 13. Electromagnetic clutches 22 and 23 are respectively provided at the periphery of the clutch plates 20 and 21 so that the rotation of the clutch plates are operatively stopped. The crankshaft 10 is connected with the outer shaft 12 by a so-called CVT (a couple of variable or changable pulleys 24 and 24 and a variable belt 25). The variable pulley 24 has a V groove and two obliques of the V groove are defined by two pulley elements. One pulley element is movable relative to the other pulley element such that pulley width and pulley diameter are changed as the movable pulley element is moved relative to the fixed pulley element. The movable pulley has an oil chamber in its back and is moved by oil fed into the oil chamber. The amount of movement is adjusted by oil pressure of the fed oil. The variable belt 25 includes a plurality of pieces which makes a chain-like endless belt in combination. A third electromagnetic clutch 28 is mounted on the crankshaft 10 in a manner such that the third clutch 28 is connected with and disconnected from the clutch 27 integrally mounted on the pulley 26.

A first impeller shaft 29 extends through the center of the first clutch plate 20 and the first impeller shaft 29 is fixed on the first clutch plate 20. The first impeller shaft 29 is coaxial with the inner shaft 13. A second impeller shaft 30 extends through the center of the second clutch plate 21 and the second impeller shaft 30 is coaxially connected with the inner shaft 13. A first compressor 31 is connected to the first impeller shaft 29 and a second compressor 32 is conneced to the second impeller shaft 30. The first compressor 31 serves as a brake means and the second compressor 32 serves as a supercharging means. The first compressor 31 has a capacity larger than the second compressor 32. The first and second compressors 31 and 32 respectively have radial casings with impellers rotatably disposed in the casings. The impeller shafts 29 and 30 extend out of the casings from the backs of the respective impellers. One end of a supercharging port 34 is connected to a discharge port 33 of the second compressor 32. The other end of the supercharging port 34 is connected to the intake passage between the charge cooler 9 and the turbocharger 6 via a flowrate control valve 35.

The first and second clutches 22 and 23 are respectively connected to a controller (CPU) 36. The controller 36 receives speed signals from a rotational speed sensor 37, accelerator signals from an accelerator opening degree sensor 39, pressure signals representing supercharged pressure of the turbocharger 7, pressure signals representing supercharged pressure of the second compressor 32 and on-off signals from a brake switch 40 of the vehicle. The speed sensor 37 detects the rotational speed of the crankshaft 10. The accelerator sensor 39 is connected with an accel pedal 38 and degree of depression of the accel pedal 38 is electrically detected by the accelerator sensor 39. The accelerator sensor 39 may be a variable slider. The accel pedal controls the rotational speed of the engine 1. The brake switch is turned on when a brake pedal is depressed by a foot of a driver and turned off as the driver's foot leaves the brake pedal, or turned on and off by a manual switch operated by the vehicle driver. The controller 36 also possesses a control map 41. The control map 41 includes data of relations between engine load (accel opening degree) and rotational speed of the engine. The controller 36 outputs on and off signals to the first, second and third clutches 22, 23 and 28, respectively. The controller 36 also outputs signals to adjust the degree of opening of the flowrate valve 35.

The control map 41 can be divided into two areas, i.e., the left half or low speed (shaded area) is an engine torque insufficient area 42 and the right half or intermediate and high speed area (non-shaded area) is an engine torque sufficient area 43. The second compressor 32 is operated in the low speed area 42 and the turbocharger 6 is used in the intermediate and high speed area 43.

Figure 2:
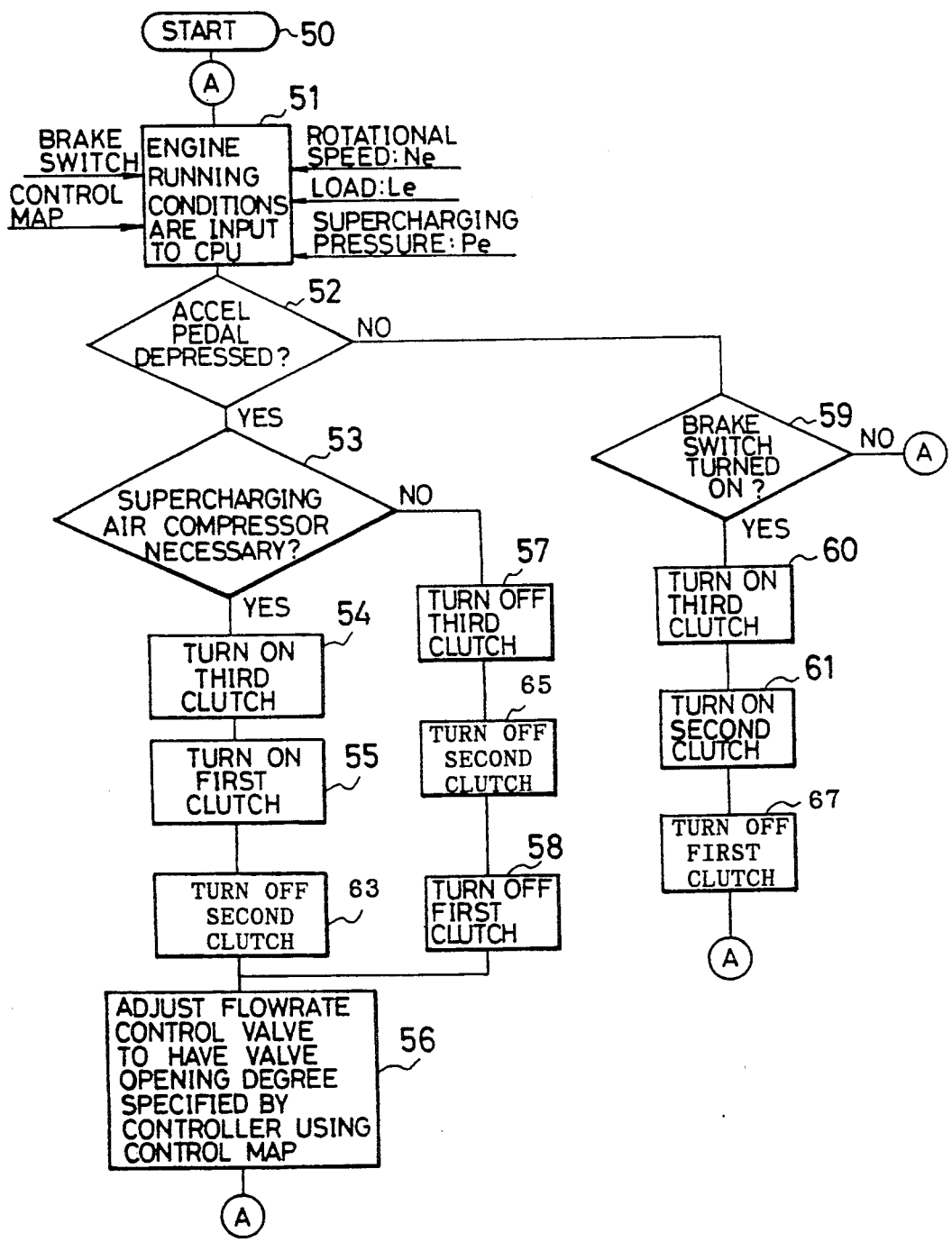
FIG. 2 is a flowchart of a controller of FIG. 1.
Figure 3:
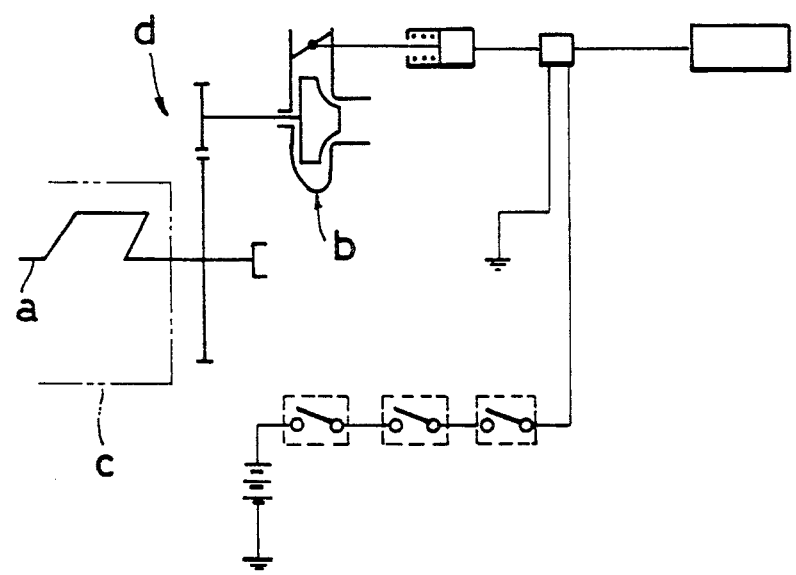
FIG. 3 is a block diagram showing an arrangement of a relevant background art.

The control by the controller 36 will be explained with the flowchart of FIG. 2. The program starts with the step 50. After the step 50, engine running conditions such as an engine revolution Ne, engine load Le and supercharging pressure Pe are input or read into the controller 36 at the step 51. Then, it is checked whether the accelerator pedel 38 is depressed at step 52. If the answer at step 52 is YES, it is checked at step 53 whether the supercharging value is in the low speed area 42 or the other area 43 in accordance with the map 41 using the opening degree of the accelerator pedal 38 and the rotational speed of the engine input to the controller. When the engine is operated in the low speed area 42, the third clutch 28 is turned on (to "turn on" means to bring the clutch into an engagement state) at the step 54. Then, the first clutch 22 is turned on at the step 55 and the flowrate control valve 35 is adjusted to have a specified opening degree at the step 56. The second clutch 23 is turned off at step 63. On the other hand, if the engine 1 is operated in the intermediate or high speed area 43, the answer at the step 53 becomes NO and the programs proceeds to the step 57. At the step 57, the third clutch 28 is turned off (to "turn off" means to bring the clutch into a disengagement state), and then the first clutch 22 is turned off at the next step (step 58) before proceeding to the step 56. The second clutch 23 is turned off at step 65.

When the accelerator pedal 38 is not depressed at the step 52, the program advances to the step 59. It is checked at the step 59 whether the vehicle is in deceleration or not based on an ON/OFF of the brake switch 40. When the brake switch is turned on, the controller judges that the vehicle is in deceleration and the third clutch 28 is turned on at the step 60. Successively, the second clutch 23 is turned on at the step 61. The first clutch 22 is turned off at step 67.

The ON/OFF of the brake switch 40, engine rotational speed, engine load, accelerator opening degree, supercharging pressure downstream of the blower 8 and supercharing pressure upstream of the flowrate control valve 35 are input to the controller 36 as the engine 1 is started. Data from the control map 41 is also input to the controller 36. Then, the controller 36 performs control of the first, second and third clutches 22, 23 and 28 in accordance with the input data using the control map 41.

When the brake is not used (normal driving) with the accelerator pedal 38 being depressed and the controller 36 judges from the detected rotational speed and load that the engine running condition is in the area 42 of the map 41, the third clutch 28 and first clutch 22 are turned on. Then, the first clutch plate 20 is fixed and the second clutch 23 is turned off. As a result, the carrier shafts 19 are fixed and the power input from the crankshaft 10 through the pulley 24 and variable belt 25 drives the external shaft 12 and internal gear 17 and further drives the sun gear 15 via the planetary gears 18. The sun gear 15 drives the second impeller shaft 30 to rotate the impeller. In other words, the impeller is rotated at a speed increased by the transmission 11 and the pressurized air or supercharging air is continuously fed into the supercharging passage 34. At this time, the controller 36 computes a difference between desired supercharging value and real supercharging value using the map 41 and various input data such as rotation speed and load. The controller 36 determines the opening degree of the flowrate control valve 35 in accordance with the difference in supercharging value computed. Therefore, the engine 1 does suffer from insufficiency of torque during the low speed driving. The engine gains additional torque in accordance with the engine load and speed. On the other hand, the supercharging by the turbocharger 6 is sufficient during the intermediate and high speed operation (area 43). Thus, the supercharging by the second compressor 32 is unnecessary. In this case, the controller 36 turns off the third clutch 28, first clutch 22 and second clutch 23 such that the power transfer to the transmission 11 is cut.

During the deceleration of the vehicle, the judgement of the controller 36 proceeds regardless of engine load and speed and depends on the ON/OFF of the brake switch 40 only. When the brake switch 40 is turned on, the first clutch 22 is turned off, second clutch 23 is turned on and third clutch 28 is turned on. As a result, the second clutch plate 21 and second impeller shaft 30 are fixed so that the power from the crankshaft 10 is transferred to the planetary gears 18 via the internal gear 17. The planetary gear 18 causes the first clutch plate 20 and first impeller shaft 29 to rotate and the impeller is rotated at an increased speed. Thus, energy of the crankshaft 10 is consumed in accordance with the pressurized air volulme and a brake force is applied to the crankshaft, thereby decelerating the vehicle.

The controller 36 adjusts the oil pressure of the oil chamber of the CVT based on the control map 41 and determines the supercharging rate and brake force of the first and second compressors 31 and 32.

An inlet 62 of the first compressor 31 may be provided with a throttle valve to raise the brake force by throttling thereby. In addition, the mechanism transferring the power of the crankshaft 10 to the external gear 12 is not limited to the CVT. For example, an arrangement including a chain and sprocket or a gear train is satisfactory. Moreover, the planetary gear set may not be employed. Instead, the first and second impeller shafts 29 and 30 may be separately connected to the crankshaft by speed increasable chain and sprocket or gear train and the chain and sprocket mechanisms or the gear train mechanisms may be provided with clutches.

We claim:

1. An engine having a turbocharger and a drive shaft, comprising:
   a first output shaft selectively connected with the drive shaft of the engine;
   a second output shaft selectively connected with the drive shaft of the engine;
   a first compressor connected with the first output shaft for consuming energy of the engine to apply a brake force to the engine;
   a second compressor connected with the second output shaft for feeding supercharged air into the engine, the second compressor having a capacity smaller than the first compressor;
   first clutch means provided on the first output shaft;
   second clutch means provided on the second output shaft; and
   a controller for releasing the second clutch means such that the second compressor feeds the supercharged air into the engine when the controller detects that an engine torque is insufficient.

2. The engine of claim 1, wherein the first and second clutch means respectively include electromagnetic clutches.

3. The engine of claim 1, wherein the first and second air compressors are centrifugal air compressors, respectively.

4. The engine of claim 1, further including a rotational speed adjusting means which includes:
   a sun gear having a shaft;
   an internal gear;
   a plurality of planetary gears provided between the sun gear and internal gear for meshing the sun gear and internal gear;
   carrier shafts respectively extending from the planetary gears;
   a first clutch plate connected with the carrier shafts and with the first output shaft, the first output shaft being coaxial with the shaft of the sun gear;
   a second clutch plate connected with the shaft of the sun gear and with the second output shaft, the second clutch plate having a center, the shaft of the sun gear extending toward the center of the second clutch plate, the second output shaft extending toward the center of the second clutch plate; and,
   an outer shaft connected with the internal gear via a flange and surrounding the shaft of the sun gear;
   power transmission means for connecting the drive shaft of the engine with the outer shaft to transfer power from the drive shaft to the outer shaft; and
   wherein the controller is further operative for connecting and disconnecting the first and second clutch plates with and from the first and second clutch plates means respectively and in accordance with load on the engine, rotational speed of the engine and opening degree of an accelerator.

5. The engine of claim 4, wherein the controller includes a control map having a first area and a second area, the controller allowing the second air compressor to feed pressurized air when data determined by load on the engine, including rotational speed of the engine, opening degree of an accelerator and supercharging pressure is in a first area whereas the controller not allowing the second air compressor to feed the pressurized air when the data in a second area, and when the data is in the first area, the first and second clutch means are operated in a manner such that the first clutch plate is fixed and the second clutch plate is not fixed whereas when the data is in the second area, the first and second clutch means are operated in a manner such that the first and second clutch plates are not fixed.

6. The engine of claim 4, wherein the first and second air compressors are centrifugal air compressors, respectively.

7. The engine of claim 4, wherein the second air compressor has an outlet, the engine has an exhaust passage and a supercharging passage connected to the outlet of the second air compressor, the turbocharger is disposed in the exhaust passage, a flowrate control valve is disposed in the exhaust passage downstream of the turbocharger, the supercharging passage is connected to the exhaust passage via the flowrate control valve and the controller adjusts the flowrate control valve in accordance with a control map.

* * * * *